(12) United States Patent
Kajioka et al.

(10) Patent No.: US 8,012,892 B2
(45) Date of Patent: Sep. 6, 2011

(54) COMPOSITE RESIN MOLDED PRODUCT AND METHOD FOR MOLDING THE SAME

(75) Inventors: Nobuyoshi Kajioka, Hiroshima (JP); Hiroyuki Hamada, Kyoto (JP); Asami Nakai, Kyoto (JP)

(73) Assignees: Daikyo Nishikawa Corporation (JP); National University Corporation Kyoto Institute of Technology (JP)

( * ) Notice: Subject to any disclaimer, the term of this patent is extended or adjusted under 35 U.S.C. 154(b) by 648 days.

(21) Appl. No.: 11/806,719

(22) Filed: Jun. 4, 2007

(65) Prior Publication Data

US 2008/0075944 A1 Mar. 27, 2008

(30) Foreign Application Priority Data

Sep. 21, 2006 (JP) ................................. 2006-255399

(51) Int. Cl.
- *B32B 27/12* (2006.01)
- *B32B 27/04* (2006.01)
- *B32B 27/32* (2006.01)
- *B32B 27/34* (2006.01)
- *B32B 27/36* (2006.01)

(52) U.S. Cl. ........ 442/150; 442/103; 442/148; 442/149; 442/164; 442/168; 442/170; 442/171; 442/172; 442/178; 442/179; 442/180

(58) Field of Classification Search .................. 442/103, 442/148, 149, 150, 164, 168, 170, 171, 172, 442/178, 179, 180

See application file for complete search history.

(56) References Cited

U.S. PATENT DOCUMENTS

| 2003/0026970 A1 * | 2/2003 | Hernandez et al. ........ 428/297.4 |
| 2005/0079779 A1 * | 4/2005 | McLeod et al. .................... 442/6 |

FOREIGN PATENT DOCUMENTS

| EP | 447223 A1 * | 9/1991 |
| JP | 04-082717 | 3/1992 |
| JP | 05-168503 | 7/1993 |
| JP | 3242399 | 10/2001 |
| JP | 2002-254469 | 9/2002 |

\* cited by examiner

*Primary Examiner* — Andrew T Piziali

(74) *Attorney, Agent, or Firm* — Studebaker & Brackett PC; Donald R. Studebaker

(57) ABSTRACT

A composite resin molded product has a molded product body made of a resin and a fiber sheet material inserted on the surface of the molded product body. The fiber sheet material is formed of a knitted fabric, and the rear surface of the knitted fabric faces the molded product. The surfaces of fiber yarns of the knitted fabric are integrated with the molded product body by melting and solidifying.

9 Claims, 5 Drawing Sheets

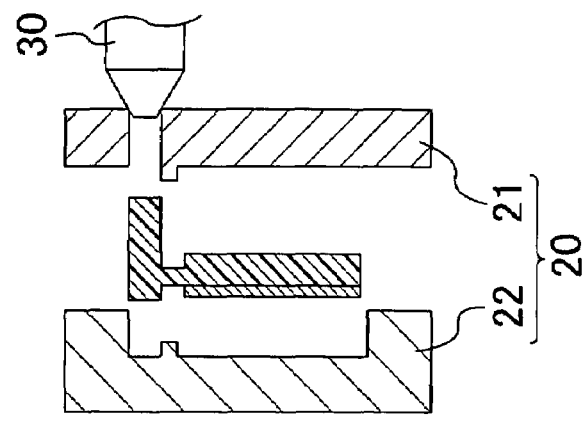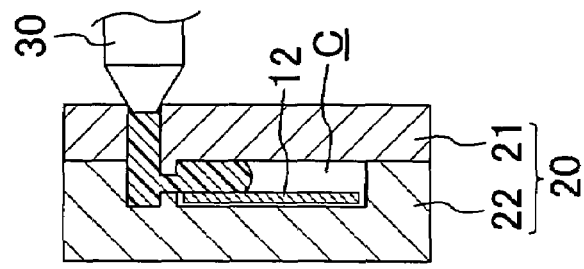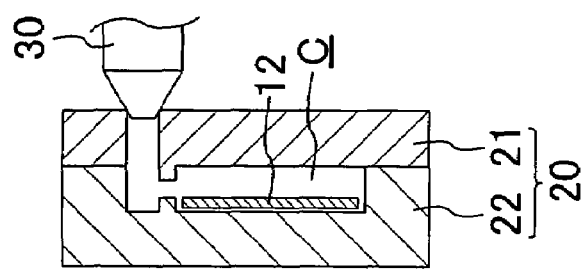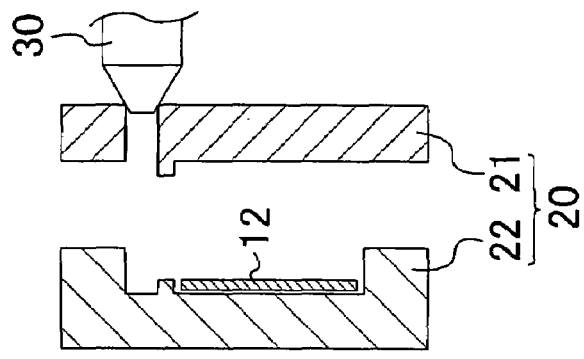

Front surface

Course direction

Rear surface

Course direction

COMPOSITE RESIN MOLDED PRODUCT AND METHOD FOR MOLDING THE SAME

BACKGROUND OF THE INVENTION

1. Technical Field

The present invention relates to a composite resin molded product comprising a molded product body made of a resin and a fiber sheet material wherein the fiber sheet material is inserted on a surface of the molded product body, and to a method of molding the composite resin molded product.

2. Related Art

Composite resin molded products, which have their resin bodies reinforced by fiber, find applications in various members including automobile parts.

For example, Japanese Patent No. 3242399 discloses a bumper beam which is molded by using a thermoplastic resin composition comprising polypropylene pellets as a main component in which the polypropylene pellets contain glass fibers which have the substantially same length as that of the pellets, and the glass fibers are arranged approximately in parallel to the longitudinal direction of the pellets.

Japanese Unexamined Patent Application No. 5-168503 discloses a shoe sole, particularly a shoe sole for sport shoes, wherein at least one fiber composite portion, comprising a matrix made of a synthetic resin and a fiber processed in the synthetic resin, is used to serve as a supporting component of the sole, and the fiber composite portion is combined with the other sole body by welding or chemically bonding.

Japanese Unexamined Patent Application No. 2002-254469 discloses a resin molded product having at least a two-dimensional reinforcing core material formed in a non-planar shape and comprising a fiber material such as woven fabric or knitted fabric; a resin surface layer covering a surface of the core material; and a resin-made structure portion molded and integrated with the resin surface layer, wherein the resin surface layer and the structure portion are molded by means of an injection molding method.

In a case of using a fiber sheet material as a reinforcing material, there is sufficient room left to improve performance of composite resin molded products by examining the fiber sheet material itself.

SUMMARY OF THE INVENTION

An object of the present invention is to improve the tensile strength and the bending stiffness of a composite resin molded product comprising a molded product body made of a resin and a fiber sheet material wherein the fiber sheet material is inserted on a surface of the molded product body.

In order to accomplish the above-mentioned object, the present invention provides a composite resin molded product comprising a molded product body made of a resin and a fiber sheet material inserted on a surface of the molded product body, wherein: the fiber sheet material includes a knitted fabric; a rear surface of the knitted fabric of the fiber sheet material faces the molded product body; and surfaces of fiber yarns of the fiber sheet material are integrated with the molded product body by melting and solidifying.

In the configuration, the rear surface of the knitted fabric constituting the fiber sheet material is provided facing the molded product body, and the surfaces of fiber yarns of the fiber sheet material are integrated with the molded product body by melting and solidifying. As a result, the reinforcing effect of the fiber constituting the fiber sheet material properly exhibits, and high tensile strength in a wale direction of knitted fabric can be obtained. In addition, high bending stiffness relative to the bending deformation in the wale direction can be obtained.

The other features and advantages of the present invention will become more apparent in the following description in reference to the accompanying drawings.

BRIEF DESCRIPTION OF THE DRAWINGS

FIG. 3A to FIG. 3D are diagrams schematically showing an injection molding method of the bumper beam.

DETAILED DESCRIPTION OF THE PREFERRED EMBODIMENTS

Embodiments will be described below in more detail referring to drawings.

Figure 1:
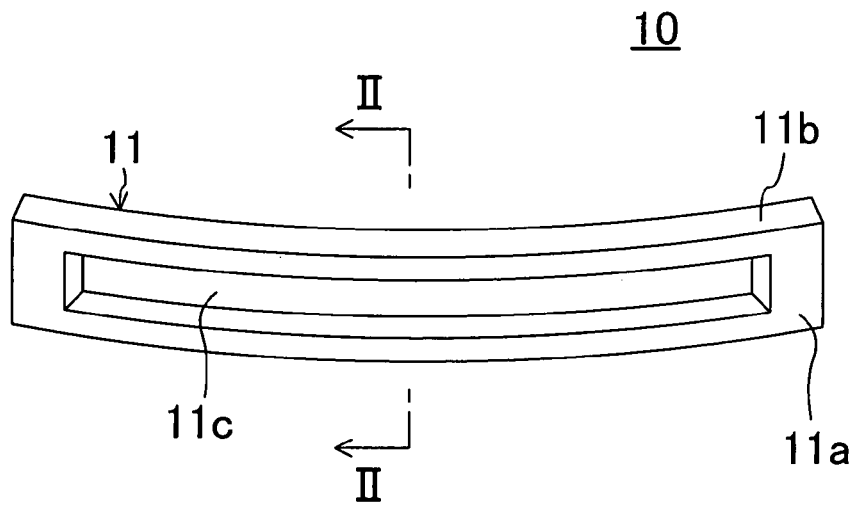
FIG. 1 is a perspective view of a bumper beam in accordance with an embodiment.
Figure 2:
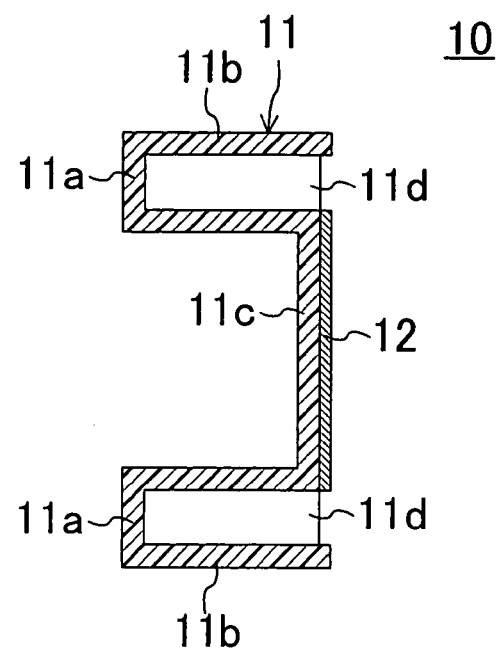
FIG. 2 is a sectional view taken along the line II-II of FIG. 1.

FIG. 1 and FIG. 2 show a bumper beam 10 for automobiles (composite resin molded product) in accordance with an embodiment.

The bumper beam 10 has a beam body 11 (molded product body) comprising a resin molded member which is formed so as to circularly extend in a horizontal direction.

The beam body 11 has a front face 11a having a horizontally long rectangular shape, a side face 11b which is continuously formed at a periphery portion of the front face 11a so as to extend in a backward direction, and a recessed portion 11c having a horizontally long rectangular shape which is formed at the center of the front face 11a so as to be recessed in a U-shaped cross section and in the backward direction. In a groove open to the backward direction and having a U-shaped section defined by an upper side of the side face 11b, an upper side of the front face 11a, and an upper side of the recessed portion 11c, and in a groove open to the backward direction and having a U-shaped section defined by a lower side of the side face 11b, a lower side of the front face 11a, and a lower side of the recessed portion 11c, a plurality of ribs are provided at given intervals in the longitudinal direction. And a fiber sheet material 12 is inserted on the rear surface of the recessed portion 11c as if to be stuck thereto.

Resin materials to form the beam body 11 include a thermoplastic resin such as a polyethylene resin, a polypropylene resin, a polyester resin, and a polyamide resin. These thermoplastic resins may be employed alone or in combination of several kinds of the thermoplastic resin. Where necessary, the resin material may contain a resin compounding agent.

The fiber sheet material 12 includes a knitted fabric having two mutually distinguishable surfaces, that is, front surface and rear surface, examples including a flat knitted fabric such as a plain knitted fabric.

The fiber sheet material 12 of a knitted fabric is provided on the rear surface of the recessed portion 11c of the beam body 11 so that the rear surface of the knitted fabric faces the beam body 11 and that the wale direction of the knitted fabric is oriented to the horizontal direction of the bumper beam 10.

Further, the surfaces of fiber yarns of the fiber sheet material 12 of a knitted fabric are integrated with the beam body 11 by melting and solidifying.

Thus, the rear surface of the fiber sheet material 12 of a knitted fabric faces the beam body 11, and the surfaces of fiber yarns of the fiber sheet material 12 of a knitted fabric are integrated with the beam body 11 by melting and solidifying. This provides proper exhibition of the reinforcing effect of the fiber constituting the fiber sheet material 12. This in turn provides high tensile strength in the wale direction of the knitted fabric, that is, in the horizontal direction of the bumper beam 10. Also realized is high bending stiffness against bending deformation in the wale direction, that is, against bending deformation of the bumper beam 10 in forward and backward directions.

Examples of the fiber constituting the fiber sheet material 12 of a knitted fabric include a synthetic fiber such as a polyethylene fiber, a polypropylene fiber, a polyester fiber, and a nylon fiber. Examples also include a fiber such as a carbon fiber, a glass fiber, and a metal fiber whose surface is coated with a thermoplastic resin. It is preferable that the fiber constituting the fiber sheet material 12 is formed of the same kind of resin material as that constituting the beam body 11. Forming the fiber sheet material 12 and the beam body 11 using the same kind of resin provides high adhesion strength between the fiber sheet material 12 and the beam body 11, resulting in a higher reinforcing effect of the fiber sheet material 12. Further, user of the same material results in high recyclability.

Next, a method for molding the bumper beam 10 by injection molding will be described referring to FIG. 3. It should be noted that FIG. 3 schematically illustrates the injection molding method and thus does not provide a meticulous illustration of molding of the bumper beam 10.

First, as shown in FIG. 3A, a mold 20 is put into a state such that a second mold 22 is distanced from a first mold 21 fixed to an injection molding machine 30, and the fiber sheet material 12 of a knitted fabric is disposed on a surface of the second mold 22 where the rear surface of the recessed portion 11c of the bumper beam 10 is to be molded so that the front surface of the fiber sheet material 12 faces the surface of the second mold 22 and that the wale direction is oriented to the horizontal direction of the bumper beam 10 to be molded.

Then, as shown in FIG. 3B, the first mold 21 and the second mold 22 are clamped so as to form a cavity C in the mold 20.

Then, as shown in FIG. 3C, the cavity C of the mold 20 is filled with a melted resin material injected from the injection molding machine 30, followed by cooling of the resin material. Here on the rear surface of the fiber sheet material 12, the molded resin is molded into the beam body 11, and the surfaces of fiber yarns of the fiber constituting the fiber sheet material 12 are integrated with the beam body 11 by melting and solidifying.

Finally, as shown in FIG. 3D, the mold 20 is opened to put out the molded bumper beam 10.

While in this embodiment the bumper beam 10 is exemplified as the composite resin molded body; this is not particularly limited to the bumper beam 10; the composite resin molded body will also find applications in automobile parts such as a door side beam, a power plant frame, and a car-body frame, and in other structure members.

Also while in this embodiment injection molding is exemplified, the molding is not limited to injection molding; the composite resin molded product can be molded by pressure molding such as hydrostatic molding.

EXAMPLES

Evaluation was carried out by the following tests.
(Test Evaluation 1)
<Test Piece for Test Evaluation>

Example 1

A mold for molding test pieces for a tensile test was fixed to an injection molding apparatus (J350ED, available from Japan Steel Works, Ltd.); a plain knitted fabric formed of an ultrahigh molecular weight polyethylene fiber (Dyneema, with 1170 filaments and a fineness of 1320 dtex, available from Toyobo Co., Ltd.) was disposed on the mold so that the front surface of the plain knitted fabric would face a molding surface of the mold. Then, with the temperature of the mold set at 50° C. and the temperature of a cylinder (resin material temperature) set at 280° C., the mold was filled with a molten polyethylene resin (211J, available from Idemitsu Kosan Co., Ltd.) injected from the injection molding apparatus, thus molding by injection a plate-shaped test piece of 155.0 mm long, 12.5 mm wide, and 3.0 mm thick. The resulting configuration of the molded test piece was such that the plain knitted fabric was inserted on one surface of the test piece so that the rear surface of the plain knitted fabric faced the test piece body.

Two test pieces were formed, one having the wale direction of the plain knitted fabric oriented along the length of the test piece (hereinafter referred to as a "wale test piece"), and another having the course direction of the plain knitted fabric oriented along the length of the test piece (hereinafter referred to as a "course test piece".) These two test pieces were referred to as Example 1.

Example 2

Test pieces were molded in the same manner as that of Example 1 except that the temperature of the mold was set at 20° C. These test pieces were referred to as Example 2.

Comparative Example 1

Test pieces were molded in the same manner as that of Example 1 except that the temperature of the cylinder was at 240° C. These test pieces were referred to as Comparative Example 1.

Comparative Example 2

Test pieces were molded in the same manner as that of Example 1 except that the temperature of the mold was set at 20° C. and the temperature of the cylinder was set at 240° C. These test pieces were referred to as Comparative Example 2.

—Control Test Pieces—

Four control test pieces were molded each using only a resin material, that is, without a fiber sheet material. Each of the four control test pieces used the same temperature for the mold and the same temperature for the cylinder as those of each one of Examples 1 and 2 and Comparative Examples 1 and 2, whose corresponding control test pieces were referred to as C-1 to C-4, respectively.

(Method for Test Evaluation)

For Examples 1 and 2, Comparative Examples 1 and 2, and C-1 to C-4, tensile test was conducted by using a precision universal test apparatus (Autograph AG-IS, available from Shimadzu Corporation). In accordance with JISK7161, the tensile test was conducted at 50 mm/min for the cross head speed, with 115 mm between the chucks, and at room temperature. Further, the tensile test was conducted for both wale test pieces and course test pieces.

Then, the tensile strengths of Examples 1 and 2 and Comparative Examples 1 and 2 were normalized on the basis of the tensile strengths of the control test pieces C-1 to C-4, which had molding conditions corresponding to those of Examples 1 and 2 and Comparative Examples 1 and 2, respectively.

<Results of Test Evaluation>

Figure 4:
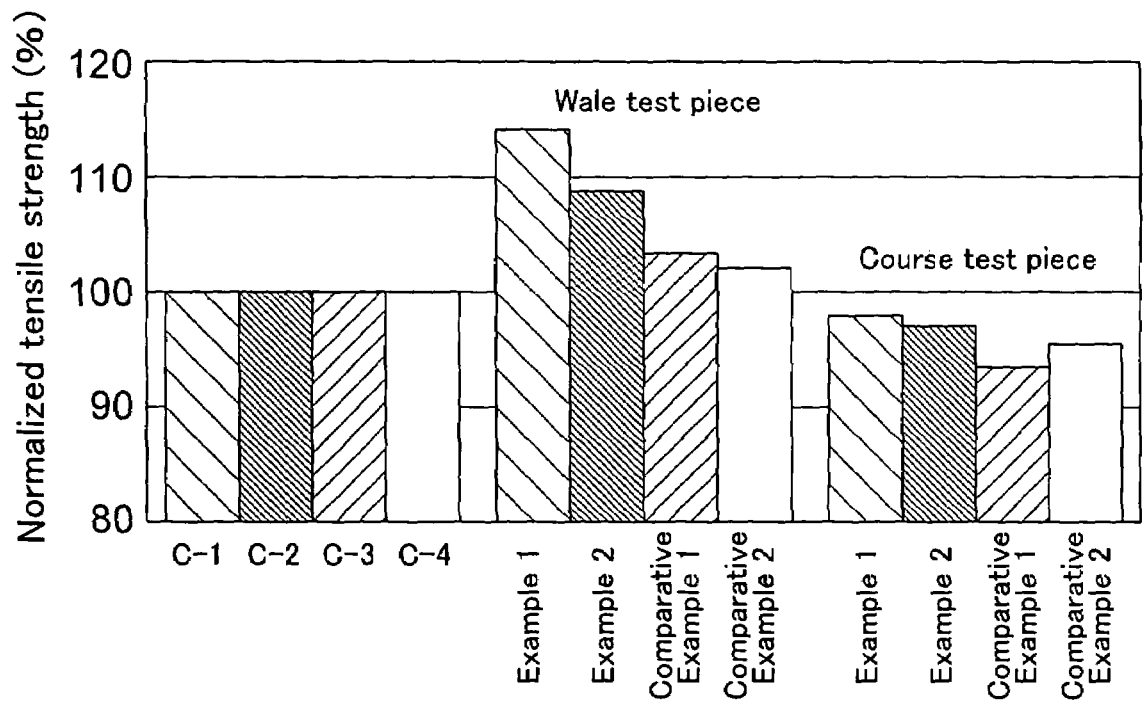
FIG. 4 is a graph showing a result of tensile test of test evaluation 1.

FIG. 4 and Table 1 show the results of the test evaluation.

TABLE 1

| | | Example 1 | Example 2 | Comparative Example 1 | Comparative Example 2 |
|---|---|---|---|---|---|
| Cylinder temperature (° C.)/ Mold Temperature (° C.) | | 280/50 | 280/20 | 240/50 | 240/20 |
| Normalized tension strength (%) | Wale test piece | 114 | 109 | 103 | 102 |
| | Course test piece | 98 | 97 | 93 | 95 |

The results show that for the wale test pieces, the tensile strengths of Examples 1 and 2 were 114% and 109%, respectively, relative to the tensile strengths of the corresponding control test pieces, while the tensile strengths of Comparative Examples 1 and 2 were 103% and 102%, respectively, relative to the tensile strengths of the corresponding control test pieces. That is, a higher cylinder temperature, i.e., a higher molding temperature provides a higher reinforcing effect.

Figure 5A:
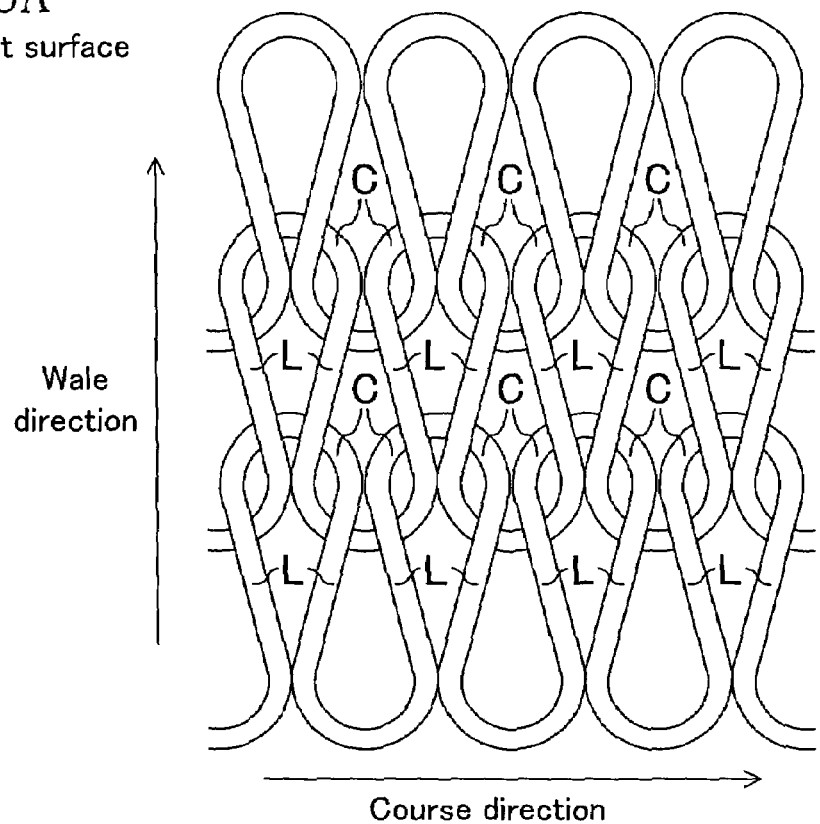
FIG. 5A is a plain view showing a front surface of a flat knitted fabric and FIG. 5B is a plain view showing a rear surface of the flat knitted fabric.
Figure 5B:
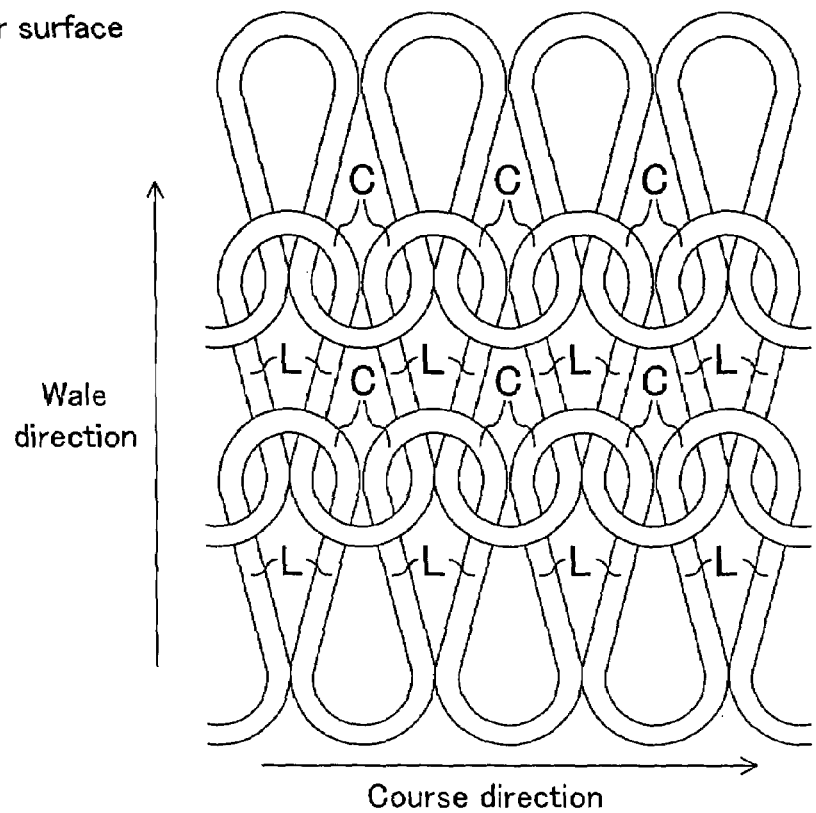

An observation for formation showed that in Examples 1 and 2, the surfaces of fiber yarns constituting the plain knitted fabric were integrated with each test piece body by melting and solidifying at a curved portion C shown in FIG. 5A and FIG. 5B, whereas in Comparative Examples 1 and 2 the surfaces of the fiber yarns were not melted and solidified.

The observation leads to the possible assumption regarding the wale test pieces of Examples 1 and 2, since the surfaces of the fiber yarns constituting each plain knitted fabric were integrated with each test piece body by melting and solidifying at the curved portion C of the fiber yarns, the degree of melting of the surfaces of the fiber yarns at a straight portion L was less than that at the curved portion C, the straight portion L of the fiber yarns effectively exhibited the reinforcing effect. As a result, a high reinforcing effect for the plain knitted fabric as a whole was obtained. Contrarily, in Comparative Examples 1 and 2, the straight portion L of the fiber yarns did not exhibit a sufficient reinforcing effect, which fell short of that exhibited by Examples 1 and 2.

Further, for the wale test pieces, it was found that the reinforcing effect of Example 1 was higher than that of Example 2, which leads to the possible assumption that the melting of the surfaces of the fiber yarns constituting each plain knitted fabric was accelerated at the curved portion C by increasing the temperature of the mold.

For the course test pieces, the tensile strengths of Examples 1 and 2 were 98% and 97% relative to those of corresponding control test pieces, respectively; and the tensile strengths of Comparative Examples 1 and 2 were 93% and 95% relative to those of corresponding control test pieces, respectively, which shows that the all cases had a lower tensile strength than those of the control test pieces. This is presumably because the plain knitted fabric expanded and contracted easily thereby failing to obtain the reinforcing effect thereof, and because there was not as much resin in volume as the volume of the plain knitted fabric, which led to a lowered strength. It should be noted, however, that the normalized tensile strengths of Examples 1 and 2 were higher than those of Comparative Examples 1 and 2. This, presumably, also resulted from the integration by melting and solidifying of the surfaces of the fiber yarns constituting each plain knitted fabric with each test piece body at the curved portion C of the fiber yarns.

For the course test pieces, there was no significant difference between Example 1 and Example 2, and between Comparative Example 1 and Comparative Example 2, which leads to the possible assumption that the temperature of the mold is not influential.

(Test Evaluation 2)
<Test Piece for Test Evaluation>

Example 1

Test pieces of Example 1 each having a length of 80.0 mm, a width of 12.5 mm and a thickness of 3.0 mm were molded in the same manner as the above description. The test pieces molded include a wale test piece and a course test piece.

Comparative Example 3

Test pieces were molded in the same manner as that of Example 1 except that the plain knitted fabric was disposed to the mold so that the rear surface of the plain knitted fabric would face the molding surface of the mold. These test pieces were referred to as Comparative Example 3. The test pieces of Comparative Example 3 are each such that the plain knitted fabric is inserted on one surface of the test piece so that the front surface of the plain knitted fabric faces the test piece body. The test pieces molded include wale test pieces and course test pieces, both including pieces having a length of 155.0 mm, a width of 12.5 mm, and a thickness of 3.0 mm, and a length of 80.0 mm, a width of 12.5 mm, and a thickness of 3.0 mm.

—Control Test Piece—

The control test piece C-1 was molded into a length of 80.0 mm, a width of 12.5 mm, and a thickness of 3.0 mm in the same manner as Example 1.

(Method for Test Evaluation)
—Tensile Test—

In the same manner as that for conducting tensile test in Test Evaluation 1, a tensile test was conducted for the test pieces of Comparative Example 3 having a length of 155.0 mm, a width of 12.5 mm, and a thickness of 3.0 mm. The tensile test was conducted for both wale test piece and course test piece.

Then, the tensile strength of Comparative Example 3 was normalized on the basis of the tensile strength of the control test piece C-1, which had molding conditions corresponding to those of Comparative Example 3.

—Bending Test—

For Example 1, Comparative Example 3, and the control test pieces of C-1, the test pieces each having a length of 80.0 mm, a width of 12.5 mm and a thickness of 3.0 mm were subjected to a bending test using a tensile compression machine (Model type: SV-201, available from Imada Manufacturing Co., Ltd.). In accordance with JISK7171, the bending test was conducted at 15.5 mm/min for the cross head speed, with 48 mm between the supporting points, and at room temperature. For Example 1 and Comparative Example 3, the wale test pieces and the course test pieces were subjected to the bending test while the test pieces were disposed with each test piece at the downward side.

The bending stiffnesses of Example 1 and Comparative Example 3 were normalized on the basis of the bending stiffnesses of the control test pieces of C-1, which had molding conditions corresponding to those of Example 1 and Comparative Example 3, respectively.

(Result of Test Evaluation)

Figure 6:
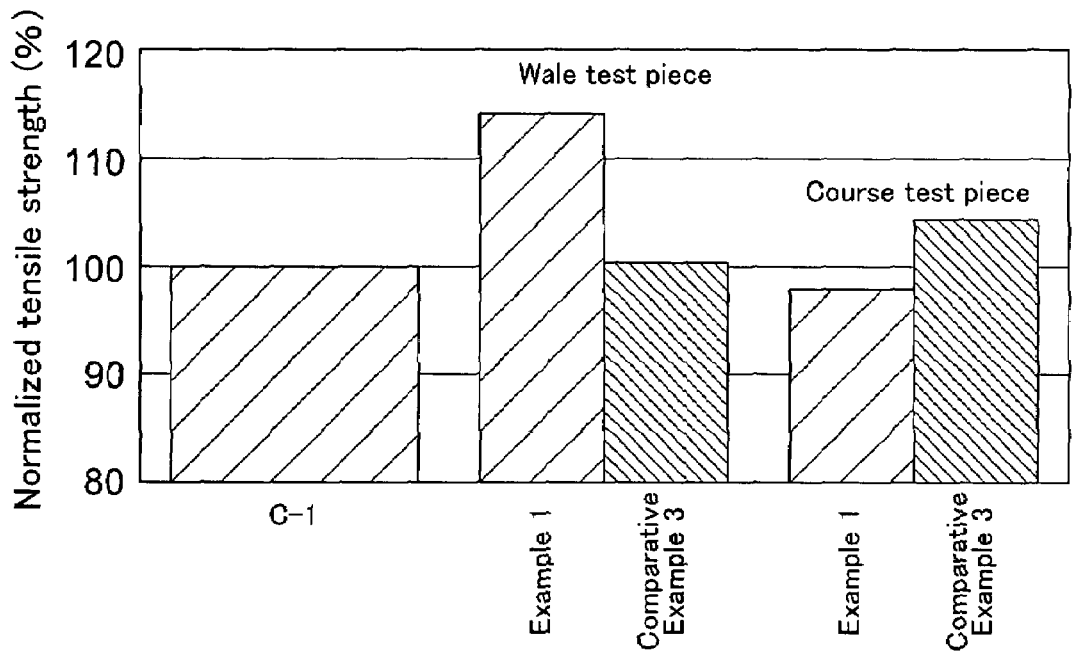
FIG. 6 is a graph showing a result of tensile test of test evaluation 2.
Figure 7:
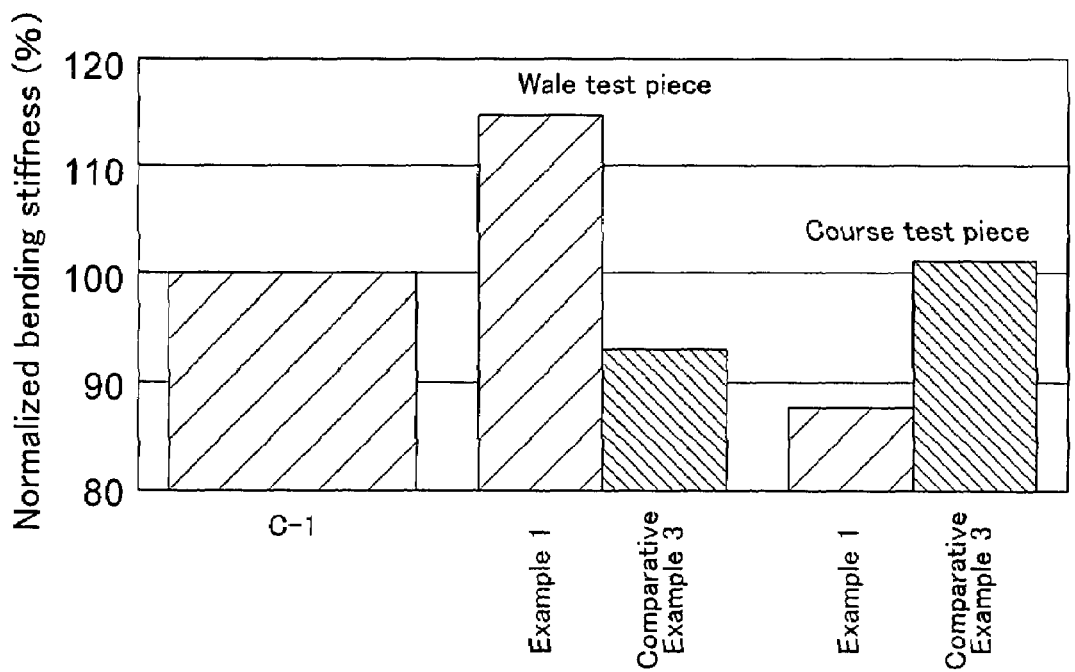
FIG. 7 is a graph showing a result of bending stiffness test of test evaluation 2.

FIG. 5, FIG. 6, and Table 2 show the results of the test evaluation.

TABLE 2

|  |  | Example 1 | Comparative Example 3 |
| --- | --- | --- | --- |
| Normalized tensile strength (%) | Wale test piece | 114 | 100 |
|  | Course test piece | 98 | 104 |
| Normalized bending stiffness (%) | Wale test piece | 115 | 93 |
|  | Course test piece | 88 | 101 |

The results show regarding the wale test pieces that in Example 1, the tensile strength was 114% and the bending stiffness was 115% relative to that of a corresponding control test piece, respectively, and in Comparative Example 3, the tensile strength was 100% and the bending stiffness was 93% relative to that of a corresponding control test piece, respectively. The results accordingly show that the reinforcing effect is higher when the rear surface of the plain knitted fabric faces the test piece body than when the front surface of the plain knitted fabric faces the test piece body. The bending stiffness of the wale test piece is one against the bending deformation in the wale direction of the plain knitted fabric, that is, the length direction of the wale test piece.

This is presumably because, as seen from FIG. 5A and FIG. 5B, the curved portion C was located on the rear surface of the plain knitted fabric while the straight portion L was located on the front surface of the plain knitted fabric. In Example 1, mainly the curved portion C was integrated with the test piece body by melting and solidifying, which caused the straight portion L to effectively exhibit the reinforcing effect in the length direction, whereas in Comparative Example 3, mainly the straight portion L was integrated with the test piece body by melting and solidifying, which lowered the reinforcing effect in the length direction.

For the course test pieces, no noticeable tendency was observed.

Many embodiments and modifications were described in the present invention; however these descriptions were only for purposes of illustration. Further modifications may be carried out by those skilled in the art without departing from the spirit and the scope of the invention which is defined by the appended claims.

What is claimed is:

1. A composite resin molded product comprising:
a molded product body made of a resin; and
a fiber sheet material inserted on a surface of the molded product body, wherein:
the fiber sheet material comprises a knitted fabric made of one single layer, and including a plurality of loops of a yarn, each loop including a pair of straight portions and a curved portion coupling the straight portions, at least surfaces of fibers constituting the yarn being made of a thermoplastic resin material;
a rear surface of the knitted fabric of the fiber sheet material faces the molded product body;
surfaces of fibers of the fiber sheet material are integrated with the molded product body by melting and solidifying;
in each of the loops of the yarn forming the knitted fabric constituting the fiber sheet material, a degree of melting and solidifying at each of the straight portions is less than that at the curved portion; and
the curved portions and the straight portions are included in the same loop.

2. The composite resin molded product according to claim 1, wherein a fiber constituting the fiber sheet material is formed of the same kind of resin material as a fiber material constituting the molded product body.

3. The composite resin molded product according to claim 1, wherein the fiber sheet material comprises a synthetic fiber.

4. The composite resin molded product according to claim 3, wherein the synthetic fiber constituting the fiber sheet material comprises a polyethylene fiber, a polypropylene fiber, a polyester filament, or a nylon fiber.

5. The composite resin molded product according to claim 1, wherein the fiber constituting the fiber sheet material comprises a carbon fiber, a glass fiber, or a metal fiber, surfaces of the fibers being coated with a thermoplastic resin.

6. The composite resin molded product according to claim 1, wherein the molded product body is formed of a thermoplastic resin material.

7. The composite resin molded product according to claim 6, wherein the thermoplastic resin constituting the molded product body includes least one selected from the group consisting of a polyethylene resin, a polypropylene resin, a polyester resin, and a polyamide resin.

8. The composite resin molded product according to claim 1, wherein the composite resin molded product is a bumper beam for an automobile.

9. The composite resin molded product according to claim 1, wherein
the molded product is made to be long, and
the knitted fabric constituting the fiber sheet material is provided so that a wale direction of the knitted fabric is provided along a length direction of the molded product body.

* * * * *